United States Patent
Pfister et al.

(10) Patent No.: US 6,353,677 B1
(45) Date of Patent: Mar. 5, 2002

(54) RENDERING OBJECTS HAVING MULTIPLE VOLUMES AND EMBEDDED GEOMETRIES USING MINIMAL DEPTH INFORMATION

(75) Inventors: Hanspeter Pfister, Somerville, MA (US); Abhir Hari Balerao, London (GB)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/219,061

(22) Filed: Dec. 22, 1998

(51) Int. Cl.[7] .................................................. G06K 9/00
(52) U.S. Cl. ........................ 382/154; 345/419; 345/424
(58) Field of Search ................................. 382/154, 164, 382/130, 131, 282, 132; 345/419, 424, 619, 621, 623

(56) References Cited

U.S. PATENT DOCUMENTS

| | | | | |
|---|---|---|---|---|
| 5,570,460 A | * | 10/1996 | Ramanujam | ................ 395/124 |
| 5,590,249 A | * | 12/1996 | Hanaoka | ..................... 395/122 |
| 5,594,842 A | * | 1/1997 | Kaufman et al. | ........... 395/124 |
| 5,625,760 A | * | 4/1997 | Fujita | ......................... 395/124 |
| 5,831,623 A | * | 11/1998 | Negishi et al. | ............. 345/424 |

* cited by examiner

*Primary Examiner*—Bhavesh Mehta
*Assistant Examiner*—Yosef Kassa
(74) *Attorney, Agent, or Firm*—Dirk Brinkman

(57) ABSTRACT

A method renders an object including multiple volumes and polygons. The method casts a ray through the object for each pixel of an image. Each rays is partitioned into segments according to surfaces of each volume. Color and opacity values are accumulated for each segment of each ray. Starting depths of each segment are merged and sorted, in an ascending order, into a combined depth list. Consecutive pairs of starting depths are taken to perform the following steps until done. A front clip plane and a back clip plane are defined for each pair of starting depths. Polygons between the front clip plane and a next volume surface are composited, voxels between the front clip plane and the back clip plane are composited, and polygons between the next volume surface and the back clip plane are composited.

6 Claims, 2 Drawing Sheets

RENDERING OBJECTS HAVING MULTIPLE VOLUMES AND EMBEDDED GEOMETRIES USING MINIMAL DEPTH INFORMATION

FIELD OF THE INVENTION

This invention relates generally to rendering graphical objects, and more particularly, to combining polygon and volume graphic objects.

BACKGROUND OF THE INVENTION

The field of rendering three-dimensional (3D) objects or synthetic models can be partitioned into two main areas: polygon rendering and volume rendering. Polygon rendering is only concerned with the surface topology, whereas volume rendering also deals with the internal structure of objects or models.

Polygon Rendering

In processors and processes designed for polygon rendering, the surfaces of the object or model are described in terms of polygons, e.g., triangles and lines. These fundamental geometric components are used to generate constituent "fragments" representing the outer surface of the object. A fragment is defined as all information (data) required to render (draw) a single image pixel that is on the surface, for example, the x and y coordinates of the pixel, the red, green, and blue color values of the pixel alpha transparency, depth values, texture coordinates, and the like. Fragments can be blended into a color (or image) buffer before being rendered as pixels.

Volume Rendering

In processors and processes designed for volume rendering, the basic building block is a 3D voxel. Depending on a viewing or projecting orientation (view frustum), voxels can be interpolated to yield volume samples. The interpolated volume samples can be considered to be equivalent to fragments as defined above. A base plane used during volume rendering can also be considered equivalent to the image plane. This correspondence makes it easier to integrate polygon rendering with volume rendering and application programming interfaces of commonly used rendering systems.

Combined Polygon and Volume Rendering

Often, it is important to combine polygon and volume rendering. For example, a surface terrain is better rendered with polygons, because flat terrain is generally homogeneous. Other effects, such as fog, are more effectively rendered with volume graphics techniques, because fog particles are intrinsically specified by their voxel values.

Mixed polygon and volume rendering is particularly useful for visualization, especially in medical applications, as described by Kaufamn et al. in "Intermixing Surface and Volume Rendering," Proc. Nato90, Berlin, 1990, vol. 60, pp. 217–227, Springer Verlag Berlin, and by Ebert et al. in "Rendering and Animation of Gaseous Phenomena by Combining Fast Volume and Scanlie A-Buffer techniques," Proc. SIGGRAPH '90, 1990. Mixed polygon and volume rendering combines the speed and storage efficiency of polygonal representations with the realism of volume graphics.

In enhanced reality applications, such as computer assisted surgery guidance as described by Kikinis et al. in "Computer Assisted Interactive Three-Dimensional Planning for Neurosurgical Procedures," Neurosurgery, Vol. 38, No. 4, pp. 640–651, 1996, or virtual endoscopy surgery simulation, as described by Geiger et al. in "Simulation of Endoscopy," Comp. Vision Virtual reality and Robotics in Med., Niece, France, 1995, pp. 227–281, the intermixing of volume objects and polygon objects allows one to choose the best representation for a particular scene.

Sampled volume data, such as CT or MR images can be directly combined with synthetic objects such as surgical instruments, probes, catheters, prostheses, and landmarks displayed as glyphs. In some instances, preoperatively derived surface models for certain anatomical structures are more appropriate. For example, skin is more efficiently stored, and better visualized as a polygon mesh.

Converting Polygons to Volume Samples

One straightforward way of mixing polygon and volume rendering is to first convert the polygonal models into sampled volumes, and then to render the converted models with volume rendering techniques, see Sobierajski et al. in "Volumetric Ray Tracing," Proc. Symposium on Volume Visualization, Washington D.C., 1994. This method is computationally expensive, because each pixel of converted polygons must be represented as a voxel, thus giving up the speed and storage advantages of polygons as described above.

Simultaneous Ray Casting

Another way to combine polygon and volume rendering is to simultaneously cast rays through both the polygonal and volume data, resample both data at the same sample intervals, and then to composite the colors and opacities in depth sort order as described by Levoy in "Efficient Ray Tracing of Volume Data," ACM Trans. On Volume Graphics, Vol. 9, No. 3, pp. 245–261, 1990. There, polygons and volumes are ray traced, with each pixel and voxel being depth sorted and merged. The method requires ray tracing of polygons, as opposed to the usual efficient scan conversion techniques. Ray tracing makes it impractical to use conventional polygon rendering hardware, further reducing the efficiency of the method.

Therefore, there is a need for a method which efficiently allows one to combine polygon and volume rendering.

SUMMARY OF THE INVENTION

The invention combines polygon and volume representations of graphical objects during rendering. The combined rendering can take advantage of the rendering ease of polygons, and the richness of volume graphic techniques.

The combination is made possible by first forming a depth-related approximation of the volume graphics object. This is done by casting rays through the object, and segmenting the rays according to volume surfaces. The segmenting produces depth information which is sorted in an ascending order. In addition, color and opacity values are accumulated according to the ray segments. Pairs of segment depths are used to define front and back clip planes, and polygons intersecting the clip surfaces are broken into smaller non-intersecting polygons.

For each pair of clip planes, interleave geometry-pixel and volume-pixel compositing as follows. Front-to-back composite rasterized geometry between the current front clip plane and a next volume surface, front-to-back composite volume-pixels between the clip planes, and front-to-back composite rasterized geometry between the next volume surface and the back clip plane.

BRIEF DESCRIPTION OF THE DRAWINGS

These and other features of the subject invention will be better understood with reference to the detailed description, taken in conjunction with the drawing, of which.

DETAILED DESCRIPTION OF THE PREFERRED EMBODIMENT

Figure 1:
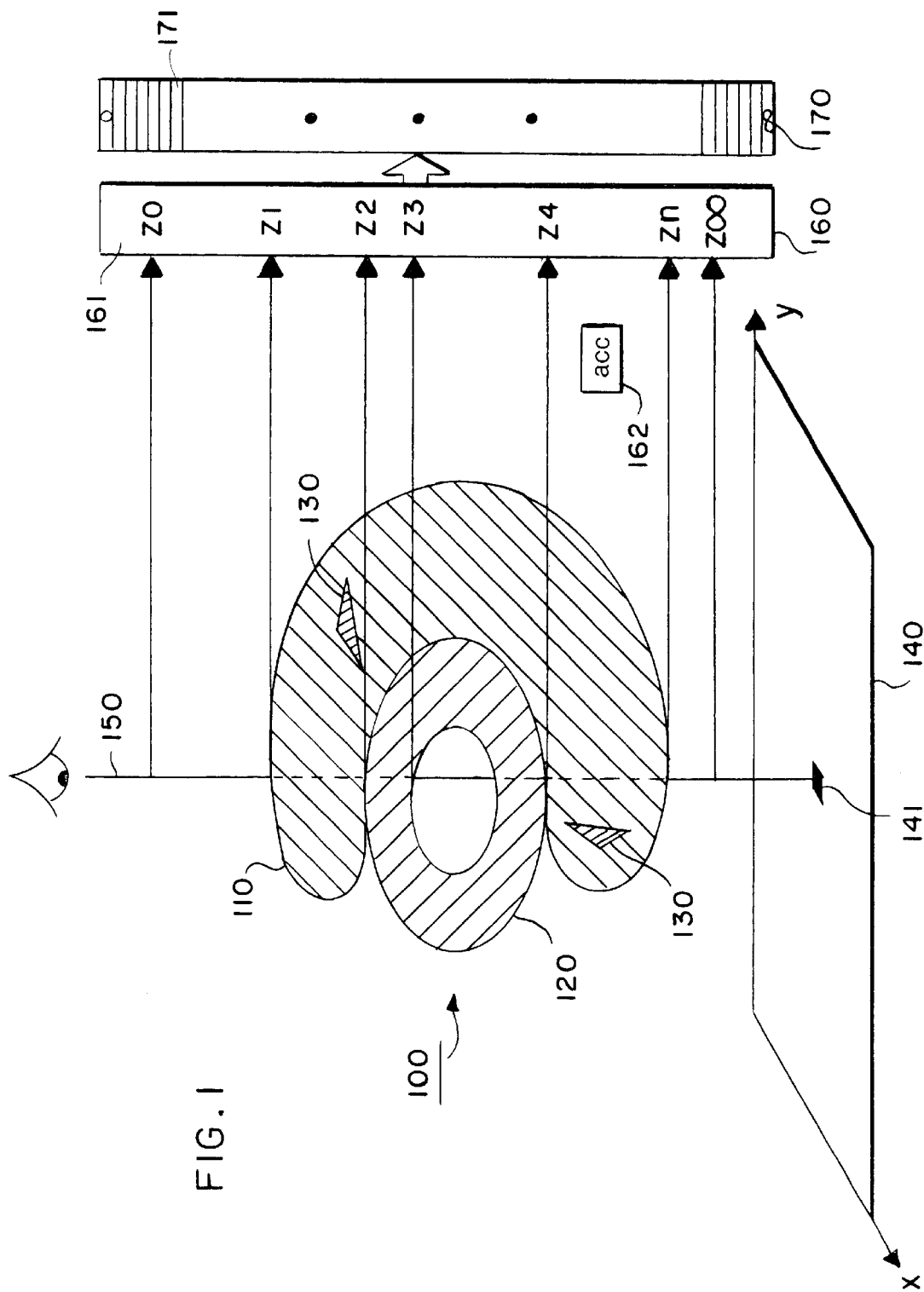
FIG. 1 is a block diagram of an object to be rendered including multiple volumes and polygon geometries using segmented rays.

FIG. 1 shows a three-dimensional object 100 composed of multiple volumes 110 and 120. The volumes are represented by voxels in a computer memory. In addition, portions 130 of the object are defined in the memory by the geometry of polygons, e.g., triangles. We provide a method that renders the object onto an image plane 140 using a minimal number of depth (z) values.

Figure 2:
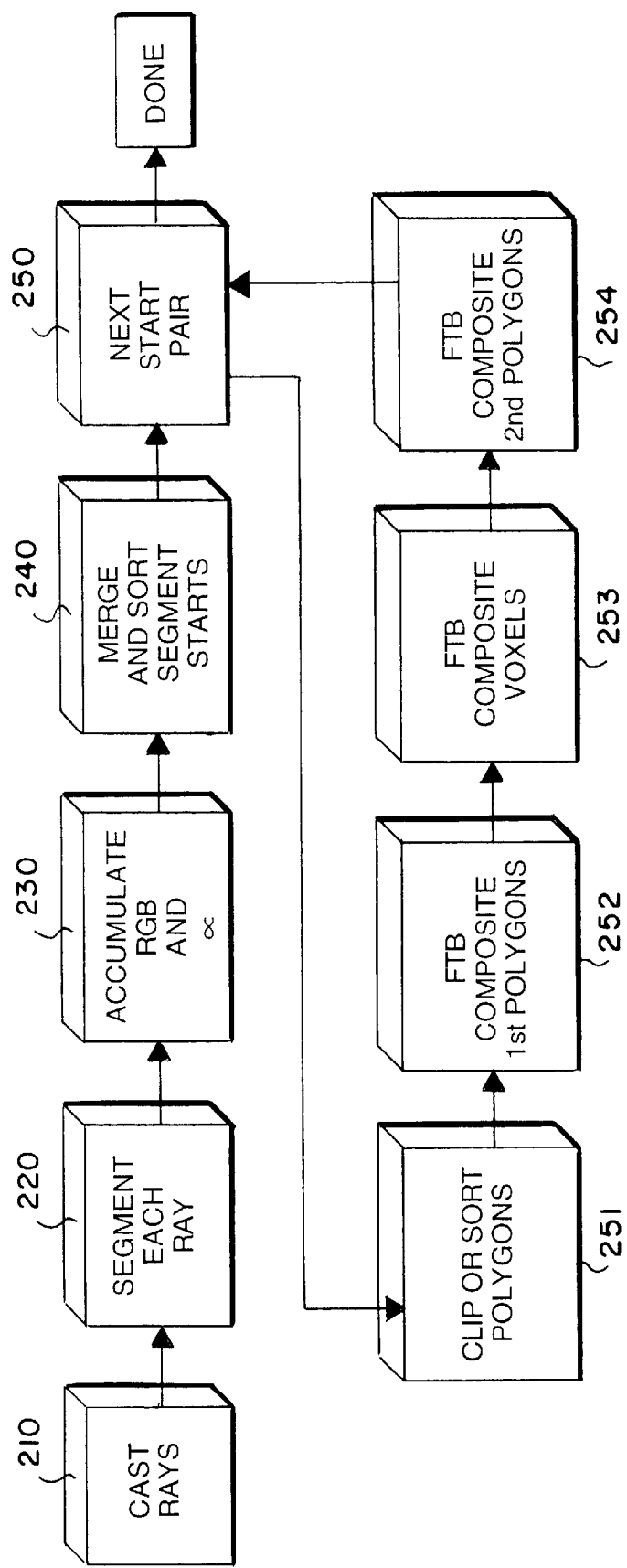
FIG. 2 is a flow diagram of a method for rendering the object of FIG. 1 using minimal depth information.

With reference to FIG. 2, our method 200 operates as follows. For each pixel p(i) 141 at a location (x, y) of the image plane, we cast a ray r(i) 150 through the object, step 210. The rays 150 are cast front-to-back, and perpendicular to the image plane. In our discussion, all depth terms (e.g., front, back, etc.) are described relative to the view frustum.

For each ray 150, we store a ray depth list 160. The entries 161 in the ray depth list 160 indicate the depth of where the corresponding ray starts and ends for each of the multiple volumes of the object 100. In addition, each list is augmented with a smallest and largest possible depth to be considered during rendering. This can account for polygons in front and behind all volumes of the object. In other words, the entries $\{z0, z1, \ldots, zn, z\infty\}$ of each ray depth list partition each ray into segments according to the surface topology of the volumes of the object, step 220. In other words, the ray depth lists 160 define the surfaces of the volumes.

We also accumulate color (RBG) and opacity ($\alpha$) values for each ray segment, step 230. The accumulated value (ACC) 162 can be associated with the depth entry that indicates where the corresponding ray segment starts in a volume. It should be noted that the accumulation can be done during the rendering by resetting the accumulated color and opacity values to zero each time a new segment is encountered. We can exclude color-opacity values where the alpha value is less than some minimum threshold, e.g., less than 0.05.

In step 240, we merge and sort all ray segment starting depths of all ray depth lists to generate a single combined depth list 170. The starting depth entries 171 in the combined depth list 170 are sorted in an ascending order. The entries 171 are used pair-wise during rendering to define front and back clip planes during rendering. The clip planes are perpendicular to the image plane 140. By having a single merged and sorted "combined" depth list, the problem of overlapping segments is avoided.

For each front and back clip plane (250), as defined by consecutive pairs of the starting depths 171 in the combined depth list 170, perform the following (251–254) until done 260.
1) Clip any polygons that intersect either the front or back clip plane into smaller non-intersecting polygons. For better efficiency, the polygons can be sorted in a depth order prior to clipping (251).
2) Front-to-back (FTB) composite all polygons behind the front clip plane but in front of the next volume surface (252).
3) Front-to-back composite all interpolated voxels (volume samples) between the front and back clip plane (253). For each pixel in the image, use the corresponding ray depth list 160 during the compositing.
4) Front-to-back composite all polygons behind the next volume surface but in front of the back clip plane (254).

As an advantage, the rendering according to our method uses considerably less storage. For typical clinical data sets (knee, femur, tibia, etc.), the number of start depth values stored in the combined list does not exceed eighteen, and the average is around three. For a 256×256 image, the total storage overhead is only about 4.3 Mbytes. Generation of the combined depth list on the average requires three compare operations per output pixel, so the processing overhead associated with generating the combined depth list is small.

In this description of the invention, we used specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for rendering an object including multiple volumes with embedded polygons, comprising the steps of:

casting a ray through the object for each pixel of an image;

partitioning each ray into segments according to surfaces of each volume;

accumulating color and opacity values for each segment of each ray;

merging and sorting, in an ascending order, starting depths of each segment into a combined depth list; and taking consecutive pairs of starting depths from the combined depth list and performing the following steps until done:
defining a front clip plane and a back clip plane using the pair of starting depths,
compositing embedded polygons between the front clip plane and a next volume surface,
compositing voxels between the front clip plane and the back clip plane, and
composing embedded polygons between the next volume surface and the back clip plane.

2. The method of claim 1 wherein any embedded polygons intersecting one of the clip planes are first divided into non-intersecting embedded polygons.

3. The method of claim 1 wherein the color and opacity values are accumulated for each segment during the compositing.

4. The method of claim 1 wherein the combined depth list includes a smallest and largest possible depth value.

5. The method of claim 1 wherein only color and opacity values greater than a minimum threshold are included.

6. The method of claim 1 wherein the compositing is front-to-back.

* * * * *